(12) United States Patent
Qu

(10) Patent No.: US 11,290,629 B2
(45) Date of Patent: Mar. 29, 2022

(54) TERMINAL DEVICE AND METHOD FOR CONTROLLING IMAGE ACQUIRER

(71) Applicant: BEIJING XIAOMI MOBILE SOFTWARE CO., LTD., Beijing (CN)

(72) Inventor: Tongxun Qu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/020,477

(22) Filed: Sep. 14, 2020

(65) Prior Publication Data

US 2021/0352197 A1   Nov. 11, 2021

(30) Foreign Application Priority Data

May 6, 2020   (CN) .......................... 202010372912.7

(51) Int. Cl.
*H04N 5/225*   (2006.01)
*H04N 5/232*   (2006.01)

(52) U.S. Cl.
CPC ......... *H04N 5/2257* (2013.01); *H04N 5/2252* (2013.01); *H04N 5/23299* (2018.08)

(58) Field of Classification Search
None
See application file for complete search history.

(56) References Cited

U.S. PATENT DOCUMENTS

| 2014/0077940 | A1* | 3/2014 | Browne ................. F03G 7/065 340/438 |
| 2014/0091210 | A1  | 4/2014 | Hogo et al. |
| 2017/0026634 | A1* | 1/2017 | Mirlay ................. H04N 13/239 |
| 2017/0047024 | A1* | 2/2017 | Hogo ................... G09G 3/2003 |

FOREIGN PATENT DOCUMENTS

| CN | 208401985 U | 1/2019 |
| CN | 208798055 U | 4/2019 |
| JP | 2006038931 A | 2/2006 |
| JP | 2010031721 A * | 2/2010 |

OTHER PUBLICATIONS

Extended European Search Report in the European Application No. 20200090.7 dated Mar. 17, 2021, (7).

* cited by examiner

*Primary Examiner* — Quan Pham
(74) *Attorney, Agent, or Firm* — Arch & Lake LLP

(57) ABSTRACT

The present disclosure relates to a terminal device and a method for controlling an image acquirer. The terminal device includes: a shell; an image acquirer positioned in the shell; and a driver positioned in the shell and connected with the image acquirer. The driver includes a memory metal, and the memory metal has different lengths in an energized state and a deenergized state, and is configured to control the image acquirer to get into and out of the shell by length extension and contraction.

18 Claims, 11 Drawing Sheets

TERMINAL DEVICE AND METHOD FOR CONTROLLING IMAGE ACQUIRER

CROSS-REFERENCE TO RELATED APPLICATIONS

This application is based upon and claims priority to Chinese Patent Application No. 202010372912.7, filed on May 6, 2020, the entire content of which is incorporated herein by reference.

TECHNICAL FIELD

The present disclosure relates to the technical field of electronic devices, and more particularly, to a terminal device and a method for controlling an image acquirer.

BACKGROUND

Along with the rapid development of terminal devices, pursuing high screen-to-body ratio such as full screen has become the development trend of present terminal devices. Since an image acquirer or an acquisition module of the terminal device may occupy a part of a screen area, for meeting a full screen development requirement of the mobile terminal, the terminal device adopts a mobile camera. That is, the camera in a shell is pushed out of the shell when image acquisition is required, and the camera is withdrawn into the shell after image acquisition is completed. However, an existing mobile camera has the problems of complex structure and occupation of a large space of the terminal device.

SUMMARY

According to a first aspect of the present disclosure, a terminal device is provided, which may include: a shell, an image acquirer, and a driver. The image acquirer may be positioned at least partially in the shell. The driver may be positioned in the shell and connected with the image acquirer, and the driver may include a memory metal. The memory metal may have different lengths in an energized state and a deenergized state, and may be configured to control the image acquirer by length extension and contraction to get into and out of the shell.

According to a second aspect of the present disclosure, a method for controlling an image acquirer is provided, which may include that: energizing and deenergizing a memory metal of a driver to control length extension and contraction of the memory metal; and driving an image acquirer by length extension and contraction of the memory metal to get into and out of a shell of a terminal device.

According to a third aspect of the present disclosure, anon-transitory computer-readable storage medium is provided, in which computer-executable instructions are stored, the computer-executable instructions being executed by a processor to implement the steps in the method above for controlling the image acquirer.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

Figure 1:
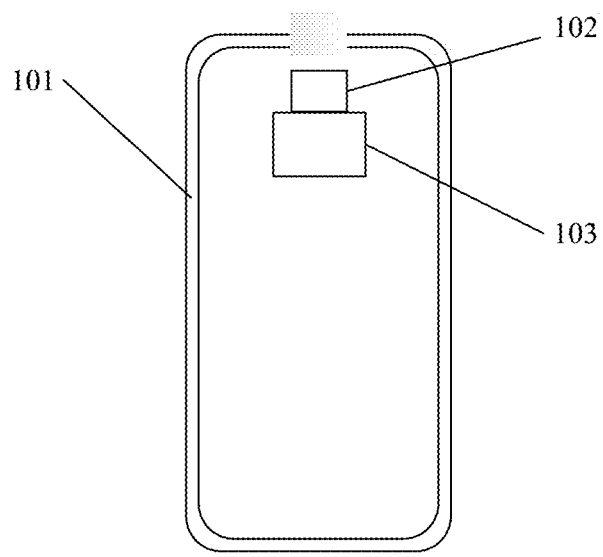
FIG. 1 is a first schematic diagram illustrating a terminal device, according to an embodiment.

FIG. 1 is a first structure diagram of a terminal device, according to an embodiment. As illustrated in FIG. 1, the terminal device includes: a shell 101, an image acquirer 102, and a driver 103.

The image acquirer 102 is positioned at least partially in the shell 101. In a sleep state, the image acquirer 102 is positioned fully in the shell 101. In a working state, the upper portion of the image acquirer 102 is positioned outside of the shell 101.

The driver 103 is positioned in the shell 101 and connected with the image acquirer 102, and the driver 103 includes a memory metal.

The memory metal has different lengths in an energized state and a deenergized state, and is configured to control the image acquirer 102 to get into and out of the shell by length extension and contraction.

The terminal device may be a mobile terminal and a wearable electronic device. For example, the mobile terminal includes a mobile phone, a notebook computer, and a tablet computer. Also, and the wearable electronic device includes a smart watch, which are not limited in the embodiment of the present disclosure.

In some embodiments, the image acquirer 102 may include an image acquisition module, an image detector, an image sensor, or an image acquisition component in the terminal device. The driver 103 may include a driving module or a driving component in the terminal device.

In the embodiments of the present disclosure, for meeting a high screen-to-body ratio requirement of the terminal device, the image acquisition module of the embodiments of the present disclosure does not acquire ambient light transmitted through a surface where a screen is located anymore, but may get into and out of the shell. When image acquisition is required, the image acquisition module is moved out of the shell to acquire the ambient light to generate an image, and the image acquisition module is moved back into the shell after image acquisition is completed.

In some embodiments, the shell has an opening, and the image acquisition module may get into and out of the shell through the opening.

It is to be noted that a position of the opening on the shell may be set according to a practical requirement. For example, when the shell is a rectangular shell, the opening may be formed on a long side of the shell, and may also be formed on a short side of the shell, which are not limited in the embodiments of the present disclosure.

A crystal structure of the memory metal may be changed based on a temperature change to further change the appearance of the memory metal. For example, the memory metal contracts above a certain temperature, and the memory metal is restored to an original shape under a certain temperature. In the embodiments of the present disclosure, the memory metal is energized to change a temperature of the memory metal, such that the length of the memory metal in the energized state is different from the length in the deenergized state. The memory metal may be made from a nickel-titanium alloy material.

It is to be noted that the length of the memory metal contracting in the energized state is less than the length of the memory metal extending in the deenergized state.

In the embodiments of the present disclosure, when the memory metal is switched from the deenergized state to the energized state, the length of the memory metal may be reduced to generate an acting force acting on the driving module to drive the image acquisition module, such that the image acquisition module gets into and out of the shell. That is, the memory metal may be controlled to be switched to the energized state to control the image acquisition module to get into and out of the shell.

In some embodiments, the terminal device further includes a power supply module or a power supplier, and the power supply module is connected with the memory metal through a switch module or a switch. When the image acquisition module moves into the shell and out of the shell, the switch module is in an on state; and when the image acquisition module is in the shell and is fixed relative to the shell, the switch module is in an off state.

In some other embodiments, the terminal device may control an energizing time length of the memory metal to control a movement height by which the image acquisition module moves out of the shell. For example, a height by which the image acquisition module moves out of the shell when the energizing time length is a first time length is less than a height by which the image acquisition module moves out of the shell when the energizing time length is a second time length, and the first time length is less than the second time length.

In the embodiments of the present disclosure, the terminal device further includes a spring connected with the image acquisition module and a fixing part for fixing the spring. In the embodiments of the present disclosure, the memory metal is connected with the image acquisition module, and the image acquisition module may be controlled to get into and out of the shell through the cooperation of the memory metal, the spring and the fixing part.

After image acquisition is completed, the memory metal is energized, and the memory metal contracts to pull the image acquisition module up into the shell to compress the spring connected with the image acquisition module. When the image acquisition module moves into the shell, the spring is fixed through the fixing part to fix the image acquisition module on the spring in the shell. After the image acquisition module is fixed, the memory metal is deenergized.

When image acquisition is required, the fixing part releases the spring, and the spring is restored to drive the image acquisition module in the shell to move out of the shell. Therefore, the memory metal may control the image acquisition module by length extension and contraction to get into and out of the shell.

Figure 2A:
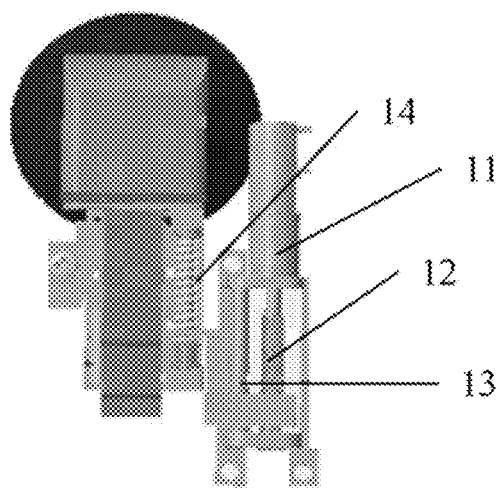
FIG. 2A is a second schematic diagram illustrating a terminal device, according to an embodiment.
Figure 2B:
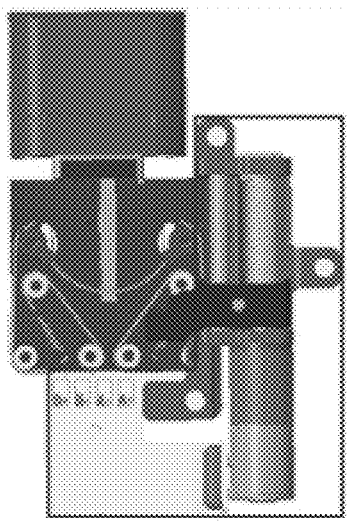
FIG. 2B is a comparison diagram of a driving module in a terminal device, according to an embodiment.

As illustrated in FIG. 2A, a driving module in a related art includes a motor 11, a lead screw 12, a propulsion lever 14 and a guide lever 13. However, each element of the driving module in the related art occupies a large space of the terminal device, and consequently, a space reserved for another device of the terminal device is reduced. For example, a space reserved for a battery of the terminal device is reduced, thereby reducing a size of the battery and further influencing a capacity of the battery. As illustrated in FIG. 2B, compared with the driving module in the related art, the driving module in the embodiments of the present disclosure in the L-shaped box may reduce a size of an occupied space of the terminal device. In addition, the image acquisition module may be driven to get into and out of the shell by accurate matching of at least three devices in the conventional driving module, which has problems of large number of the matched devices and complex structural design.

In view of this, in the embodiments of the present disclosure, the image acquisition module is controlled by length extension and contraction in the energized state and the deenergized state to get into and out of the shell. That is, in the embodiments of the present disclosure, the image acquisition module is not driven by a conventional driving module consisting of a motor and a lead screw anymore, and instead, the image acquisition module is driven by the memory metal. Therefore, on one hand, a size of the terminal device occupied by the memory metal is far less than a size of the terminal device occupied by the conventional driving module, a space of the terminal device occupied by the driving module may be reduced, and the space utilization rate of the terminal device may be increased. On the other hand, compared with existing implementation of driving by cooperation of at least three devices, the embodiments of the present disclosure has the advantages that the image acquisition module may be controlled only through the memory metal to get into and out of the shell, the number of driving devices may be reduced, and a structural design of the driving device may be simplified.

Figure 3:
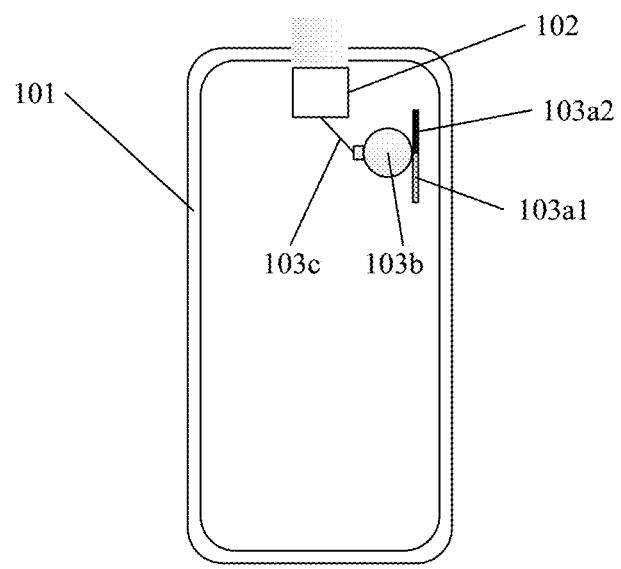
FIG. 3 is a third schematic diagram illustrating a terminal device, according to an embodiment.

In some embodiments, as illustrated in FIG. 3, the memory metal includes a first metal piece 103$a$1 and a second metal piece 103$a$2 different from the first metal piece in energizing time. For example, the first metal piece 103$a$1 may be energized and expanded in a first time period while the second metal piece 103$a$2 may be energized and expanded in a second time period that is different from the first time period.

The driving module further includes: a rotating part 103$b$ and a first elastic piece 103$c$. The rotating part 103$b$ is connected with the first metal piece 103a1 and the second metal piece 103a2 respectively.

The rotating part 103b is driven to rotate clockwise when the first metal piece 103a1 is energized and contracts. The rotating part 103b is driven to rotate counterclockwise when the second metal piece 103a2 is energized and contracts.

The first elastic piece 103c is connected with the rotating part 103b and the image acquisition module 102 respectively.

A length of the first elastic piece 103c changes along with rotation of the rotating part 103b; and the image acquisition module 102 gets into and out of the shell along with length changing of the first elastic piece 103c.

Both the first metal piece and the second metal piece are memory metals, and may generate acting forces in the energized state to drive the rotating part to rotate.

It is to be noted that the acting forces generated by contraction of the first metal piece and the second metal piece are directly proportional to lengths of the first metal piece and the second metal piece in the deenergized state. That is, if the lengths of the first metal piece and the second metal piece in the deenergized state are larger, the acting forces generated by contraction of the first metal piece and the second metal piece are stronger. Therefore, in the embodiments of the present disclosure, the lengths of the first metal piece and the second metal piece in the deenergized state may be set according to magnitudes of driving forces required by driving the image acquisition module to get into and out of the shell.

For example, when the magnitudes of the driving forces required by driving the image acquisition module to get into and out of the shell are different, the lengths of the first metal piece and the second metal piece in the deenergized state may be set to also be different. When the magnitudes of the driving forces required by driving the image acquisition module to get into and out of the shell are the same, the lengths of the first metal piece and the second metal piece in the deenergized state may be set to also be the same.

Energizing time of the first metal piece and the second metal piece are different. The first metal piece and the second metal piece are energized at different time to cause the first metal piece and the second metal piece to drive the image acquisition module to move into the shell or move out of the shell.

It is to be noted that the energizing time may be set according to image acquisition time and image acquisition completion time. For example, when image acquisition is required, the first metal piece is energized and the second metal piece is deenergized, such that the first metal piece drives the image acquisition module to move out of the shell; and after image acquisition is completed, the first metal piece is deenergized and the second metal piece is energized, such that the second metal piece drives the image acquisition module to be withdrawn into the shell.

When the first metal piece is energized and the second metal piece is deenergized, the first metal piece drives the rotating part to rotate, such that the rotating part may pull the second metal piece to further drive the second metal piece in the deenergized state to move around the rotating part along with rotation of the rotating part. Similarly, when the first metal piece is deenergized and the second metal piece is energized, the rotating part may pull the first metal piece to drive the first metal piece in the deenergized state to move around the rotating part along with rotation of the rotating part.

In the embodiments of the present disclosure, the first elastic piece is fixedly connected with the rotating part and the image acquisition module respectively. The rotating part may rotate clockwise, such that the first elastic piece of which the length changes drives the image acquisition module to move out of the shell, and the image acquisition module may further implement image acquisition based on the ambient light. The rotating part may rotate counterclockwise, such that the first elastic piece of which the length changes drives the image acquisition module to move into the shell, and the shell may protect the image acquisition module to reduce the condition that the image acquisition module is damaged when the terminal device falls.

In some embodiments, when the image acquisition module gets into and out of the shell, a rotation angle of clockwise rotation of the rotating part is equal to a rotation angle of counterclockwise rotation of the rotating part. For example, the rotating part rotates 90 degrees or 45 degrees, which are not limited in the embodiments of the present disclosure.

In the embodiments of the present disclosure, when the rotating part rotates, a movement trajectory of a rotational movement is an arc, while the image acquisition module gets into and out of the shell in a preset rectilinear direction. Therefore, when the rotating part rotates, a distance between the rotating part and the image acquisition module changes, and thus the length of the first elastic piece connected between the rotating part and the image acquisition module further changes and may change along with rotation of the rotating part.

It is to be noted that the length of the first elastic piece changing along with rotation of the rotating part includes that: the length of the first elastic piece changes along with the rotation angle of the rotating part. For example, when the rotation angle of the rotating part gradually increases from a starting point, the length of the first elastic piece may gradually increase from a length in a contraction state to a length in a natural state; or, the length of the first elastic piece may gradually decrease from the length in the natural state; or, the length of the first elastic piece may decrease from the length in the natural state at first and then is restored to the length in the natural state, which are not limited in the embodiments of the present disclosure.

Exemplarily, the first elastic piece may include spring steel.

In the embodiments of the present disclosure, the operation that the image acquisition module gets into and out of the shell along with length changing of the first elastic piece may include that: when the first elastic piece is shortened from the length in the natural state at first and then restored to the length in the natural state, the image acquisition module is pushed to move out of the shell, or the image acquisition module outside the shell is pulled back into the shell.

For example, when image acquisition is required, the first memory metal is energized, the rotating part rotates clockwise, then the first elastic piece is gradually shortened from the length in the natural state. The length of the first elastic piece, after decreasing to a preset length, increases to restore the deformation and push the image acquisition module through an acting force generated by restoration of the deformation to move out of the shell. In such case, after the deformation of the first elastic piece is restored, the first memory metal may be deenergized in the embodiments of the present disclosure.

After image acquisition is completed, the second memory metal is energized, the rotating part rotates counterclockwise, then the first elastic piece is gradually shortened from the length in the natural state. The length of the first elastic piece, after decreasing to the preset length, increases to restore the deformation and pull the image acquisition module back into the shell through the acting force generated by restoration of the deformation. In such case, after the deformation of the first elastic piece is restored, the second memory metal may be deenergized in the embodiments of the present disclosure.

Accordingly, when image acquisition is required, through the acting force generated by restoration of the deformation of the first elastic piece, the image acquisition module may be rapidly pushed out of the shell or the image acquisition module may be rapidly pulled back into the shell, such that not only is time required by movement of the image acquisition module out of the shell saved, but also time for movement of the image acquisition module into the shell is saved.

It can be understood that, in the embodiments of the present disclosure, the rotating part may be driven to rotate in opposite directions based on the acting forces generated by contraction of the first metal piece and the second metal piece in the energized state, the length of the first elastic piece changes through the rotational movement of the rotating part, and then the image acquisition module may be driven by length changing of the first elastic piece to get into and out of the shell. It can be seen that, in the embodiments of the present disclosure, the image acquisition module is not driven by an acting force generated by the conventional motor anymore, but is driven by the acting forces generated by contraction of the two metal pieces under temperature changing, such that the occupied space of the terminal device may be reduced, the space utilization rate of the terminal device may be increased, and the structural design of the driving module may also be simplified.

Figure 4:
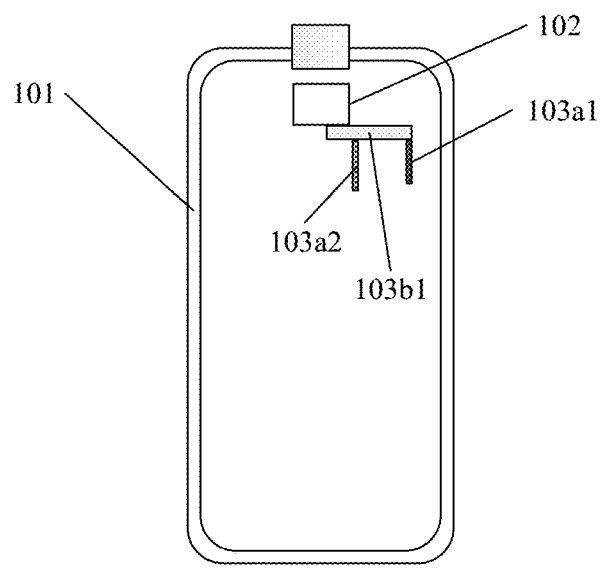
FIG. 4 is a fourth schematic diagram illustrating a terminal device, according to an embodiment.

In some embodiments, as illustrated in FIG. 4, the rotating part is a rotating shaft 103b1. The first metal piece 103a1 and the second metal piece 103a2 are connected with the rotating shaft 103b1 respectively, and the junction between the first metal piece 103a1 and the rotating shaft 103b1 and the junction between the second metal piece 103a2 and the rotating shaft 103b1 are at different positions on a same straight line.

In the embodiments of the present disclosure, the junction of the first metal piece and the rotating shaft is a first junction, and the junction of the second metal piece and the rotating shaft is a second junction. The first junction and the second junction are at different positions on the same straight line.

That is, the first junction and the second junction are different points on the rotating shaft respectively. When the first metal piece and the second metal piece are energized and contract, forces are applied to the first junction and the second junction in different time periods such that the rotating part may rotate in opposite directions to further drive the image acquisition module connected with the rotating shaft to get into and out of the shell.

The rotating shaft includes a rotation center, and the rotating shaft may rotate about the rotation center.

In some embodiments, the rotation center, the first junction and the second junction may be different positions on the same straight line, and the first junction and the second junction are on two sides of the rotation center. When the rotating shaft rotates, movement directions of the first junction and the second junction are opposite. Therefore, the first metal piece and the second metal piece may apply acting forces of the same direction to the first junction and the second junction in different time periods to cause the rotating shaft to rotate in opposite directions.

When image acquisition is required, the first metal piece may act on the first junction in the shell to drive the rotating shaft to rotate clockwise and further drive the image acquisition module to move out of the shell based on the first elastic piece which is connected with the rotating shaft and of which the length changes.

When image acquisition is completed, the second metal piece may also act on the second junction in the shell to drive the rotating shaft to rotate counterclockwise and further drive the image acquisition module to move into the shell based on the first elastic piece which is connected with the rotating shaft and of which the length changes.

In some embodiments, the driving module further includes: a fixed ring fixed on the rotating part. The first metal piece and the second metal piece are connected with the rotating part through the fixed ring respectively.

In the embodiments of the present disclosure, the first metal piece and the second metal piece are fixedly connected with the fixed ring respectively, and may act on the fixed ring, such that the fixed ring drives the rotating part to rotate in opposite directions to further drive the image acquisition module connected with the rotating part to get into and out of the shell.

The fixed ring may be fixed on the rotating part through a welding fixture, for example, by laser welding.

It is to be noted that there may be one or two fixed rings. When there is one fixed ring, junctions of the first metal piece and the second metal piece and the fixed ring may be at different positions on the fixed ring. When there are two fixed rings, the first metal piece may be connected with one fixed ring, and the second metal piece may be connected with the other fixed ring.

In the embodiments of the present disclosure, when there are two fixed rings, the two fixed rings may be at different positions on the rotating part. For example, the two fixed rings may be at opposite ends of the rotating part. Therefore, the first metal piece and the second metal piece may apply acting forces to the two fixed rings to drive the rotating part through the fixed rings to rotate in opposite directions.

Figure 5A:
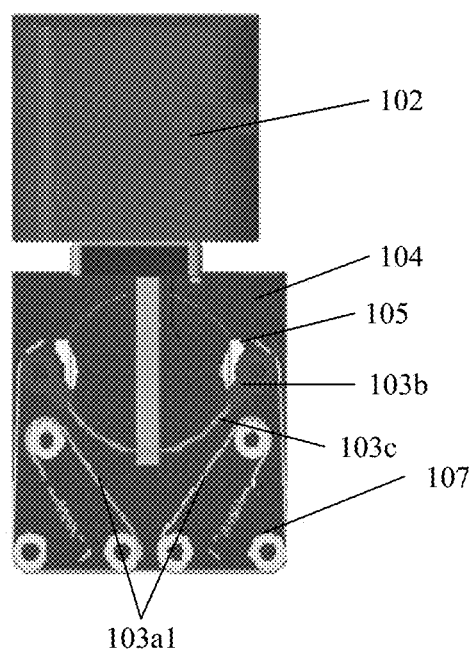
FIG. 5A is a fifth schematic diagram illustrating a terminal device, according to an embodiment.
Figure 5B:
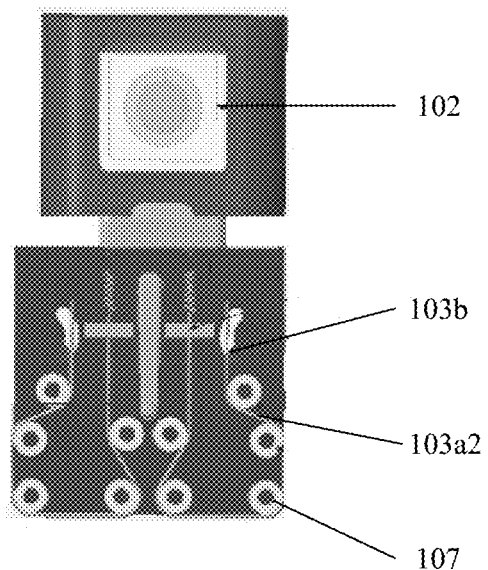
FIG. 5B is a sixth schematic diagram illustrating a terminal device, according to an embodiment.

In some embodiments, as illustrated in FIG. 5A and FIG. 5B, the terminal device further includes: a printed circuit board 104, positioned in the shell and having a through hole 105. Both the rotating part 103b and the first metal piece 103a1 are on a first surface of the printed circuit board, the second metal piece 103a2 is on a second surface of the printed circuit board which is an opposite surface of the first surface, and the second metal piece 103a2 penetrates through the through hole 105 to be connected with the rotating part 103b.

In the embodiments of the present disclosure, the rotating part, the first metal piece and the second metal piece are arranged on the two opposite surfaces of the printed circuit board respectively. Therefore, according to the embodiments of the present disclosure, the condition that a large space of the printed circuit board is occupied on the same surface of the printed circuit board because the three are arranged on the surface may be reduced, and furthermore, influence on an arrangement space for another device of the terminal device on the surface is eliminated. In addition, each device in the driving module is arranged on the two opposite surfaces of the printed circuit board, such that a three-dimensional layout may be implemented, and higher layout flexibility is achieved.

The printed circuit board is a carrier for each component of the terminal device and may implement electrical connection of each component of the terminal device. The through hole is a connecting channel, and may be used for the second metal piece on the second surface to connect with the rotating part on the first surface.

In some other embodiments, the first metal piece and the second metal piece may be arranged on a same surface of the printed circuit board, and are not limited to be arranged on the two opposite surfaces of the printed circuit board.

In the embodiments of the present disclosure, the carrier of the rotating part, the first metal piece and the second metal piece of the terminal device may not only be the printed circuit board but also be a base of a composite structure.

Figure 6:
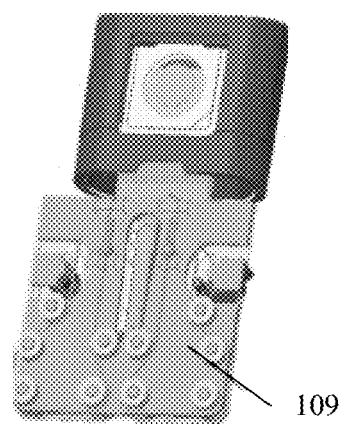
FIG. 6 is a seventh schematic diagram illustrating a terminal device, according to an embodiment.

In some embodiments, as illustrated in FIG. 6, the terminal device may further include a base 109, the rotating part and the first metal piece are on a third surface of the base, and the second metal piece is on a fourth surface opposite to the third surface of the base. The base includes a metal plate and plastic on two opposite sides of the metal plate.

Accordingly, the base is adopted as the carrier, such that the metal plate of the base may strengthen the bearing strength on one hand, and on the other hand, the plastic of the base may act in insulation to prevent short-circuit.

It is to be noted that the metal plate may be machined by using a computerized numerical control (CNC) technology. The plastic may be formed by injection molding on the metal plate.

In the embodiments of the present disclosure, one first metal piece and one second metal piece may form a driving unit, and multiple driving units may be connected to one rotating part, connection positions and energized states of the first metal pieces and second metal pieces in the multiple driving units being the same. The rotating part is driven by the multiple driving units to rotate to provide a sufficient driving force. It is to be noted that the number of the driving units may be set according to the driving forces required by driving the image acquisition module to get into and out of the shell. For example, it may be set that two driving units or three driving units are required to drive the image acquisition module to get into and out of the shell, which are not limited in the embodiments of the present disclosure.

In some embodiments, as illustrated in FIG. 5A, there are multiple rotating parts 103b, and the rotating parts 103b are connected with different memory metals 103a1.

The operation that the rotating parts are connected with different memory metals may include that: one rotating part is connected with a first metal piece and second metal piece of one memory metal respectively, the rotating part is driven to rotate clockwise through the first metal piece, and the rotating part is driven to rotate counterclockwise through the second metal piece.

In the embodiments of the present disclosure, all the multiple rotating parts are connected with the first elastic piece to provide the driving forces for driving the image acquisition module on the first elastic piece to get into and out of the shell. The first elastic piece may also convert the rotational movement into a linear movement.

It is to be noted that the multiple rotating parts work cooperatively, and each memory metal may drive the corresponding rotating part to rotate in opposite directions. In the same energizing time period, each memory metal drives the image acquisition module to move through the respectively corresponding rotating part, and each memory metal applies an acting force to the image acquisition module to drive the image acquisition module to move in the same direction.

In the embodiments of the present disclosure, the multiple rotating parts may be arranged on one side of the first elastic piece, and may also be arranged on two sides of the first elastic piece. For example, when there are two rotating parts, the two rotating parts may be symmetrically arranged on the two sides of the first elastic piece, and the two rotating parts may symmetrically move by taking a perpendicular bisector of a connecting line between the two rotating parts as a symmetry axis to co-act on the first elastic piece, such that the first elastic piece drives the image acquisition module by length changing to get into and out of the shell.

It is to be noted that, when the two rotating parts are symmetrically arranged on the two sides of the first elastic piece and move symmetrically based on the symmetry axis, a first fixed point and second fixed point for fixed connection between the two rotating parts and the first elastic piece are also symmetric. When the two rotating parts rotate, a distance between the first fixed point and the second fixed point changes, and furthermore, the length of the first elastic piece changes.

In the embodiments of the present disclosure, when the first fixed point on the rotating part moves from a first position to a second position, the distance between the first fixed point and the second fixed point decreases, the length of the first elastic piece decreases, and the first elastic piece is compressed. In case of movement from the second position to a third position, the distance between the first fixed point and the second fixed point increases, the length of the first elastic piece increases, and the deformation is restored. The first position, the second position and the third position are different positions in a movement trajectory of the first fixed point when the image acquisition module gets into and out of the shell.

Similarly, when the first fixed point moves from the third position to the second position, the distance between the first fixed point and the second fixed point decreases, the length of the first elastic piece decreases, and the first elastic piece is compressed. When the first fixed point moves from the second position to the first position, the distance between the first fixed point and the second fixed point increases, the length of the first elastic piece increases, and the deformation is restored.

It is to be noted that the first position may be in the shell correspondingly to the image acquisition module, and the second position may be outside the shell correspondingly to the image acquisition module. Or, the first position may be outside the shell correspondingly to the image acquisition module, and the second position may be in the shell correspondingly to the image acquisition module, which are not limited in the embodiments of the present disclosure.

As illustrated in FIG. 5A, two rotating parts 103b, two first metal pieces 103a1, two cambered through holes 105 and a first elastic piece 103c are arranged on the first surface. The two rotating parts 103b are symmetrically arranged on two sides of the first elastic piece 103c, and are fixedly connected with the first elastic piece 103c. The two rotating parts 103b may symmetrically move around the cambered through holes 105 by taking a perpendicular bisector of a connecting line between the two rotating parts 103b as a symmetry axis. The two first metal pieces 103a1 are connected with the two rotating parts 103b respectively. As illustrated in FIG. 5B, two second metal pieces 103a2 are arranged on the second surface, and are connected with the corresponding rotating parts 103b through the corresponding through holes 105 respectively.

Moreover, it can be seen from FIG. 5A and FIG. 5B that, when the first fixed point for fixed connection between the rotating part and the first elastic piece moves from the first position to the second position, the rotating part rotates 45 degrees, and the length of the first elastic piece is compressed from the length in the natural state to the preset length. When the first fixed point moves from the second position to the third position, the rotating part continues rotating 45 degrees, and the length of the first elastic piece is restored from the preset length to the length in the natural state. The first position is in the shell correspondingly to the image acquisition module, the third position is outside the shell correspondingly to the image acquisition module, and the second position is a middle position between the first position and the third position.

When image acquisition is required, the two first metal pieces are simultaneously energized, and the first fixed point starts rotating from the first position through acting forces generated by contraction of the two first metal pieces. When the first fixed point rotates by the second position, namely rotating to an angle greater than 45 degrees, the first elastic piece may drive the image acquisition module through the acting force generated by restoration of the deformation to speed up to move to the third position, namely the image acquisition module speeds up to move out of the shell.

When image acquisition is completed, the two second metal pieces are simultaneously energized, and the first fixed point starts rotating from the third position through acting forces generated by contraction of the two second metal pieces. When the first fixed point rotates by the second position, namely rotating to an angle greater than 45 degrees, the first elastic piece may drive the image acquisition module through the acting force generated by restoration of the deformation to speed up to move to the first position, namely the image acquisition module speeds up to move into the shell.

In some embodiments, as illustrated in FIG. 5A and FIG. 5B, the terminal device further includes: a pulley block, including at least two pulleys 107 at different positions. The memory metal surrounds the pulley block, and the memory metal extends and contracts along a surrounding path.

In the embodiments of the present disclosure, the at least two pulleys are fixed at different positions of the printed circuit board. A layout of the at least two pulleys on the printed circuit board may be set according to a practical requirement. For example, the at least two pulleys may be arranged in a triangle or a quadrangle, and the like on the printed circuit board.

Moreover, the numbers of pulley blocks surrounded by the first metal piece and second metal piece of the memory metal may be set according to a practical requirement. For example, the numbers of the pulley blocks surrounded by the first metal piece and the second metal piece may be set to be the same and both are 5 or 7. The numbers of the pulley blocks surrounded by the first metal piece and the second metal piece may also be set to be different.

As illustrated in FIG. 5A and FIG. 5B, when the first metal piece 103a1 and the rotating part 103b are on the first surface of the printed circuit board and the second metal piece is on the second surface of the printed circuit board, the number of the pulleys surrounded by the first metal piece is 6, and the number of the pulleys surrounded by the second metal piece is 10.

In the embodiments of the present disclosure, the memory metal surrounds the pulley block, and a wiring length of the memory metal in a finite space may be increased through the pulley block. In addition, when the memory metal extends and contracts along the surrounding path, a frictional force with the memory metal may be reduced through the pulleys, such that the acting force generated by extension and contraction of the memory metal acts on the image acquisition module more.

Figure 7:
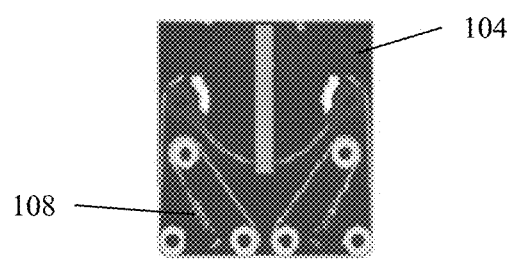
FIG. 7 is an eighth schematic diagram illustrating a terminal device, according to an embodiment.

In some embodiments, as illustrated in FIG. 7, the terminal device further includes: a second elastic piece 108, one end being fixed in the shell and the other end being connected with the memory metal. When the memory metal is energized, the second elastic piece is stretched; and when the memory metal is deenergized, the second elastic piece contracts to tension the memory metal releasing a contraction length in the deenergized state to make the memory metal in a straightened state.

In the embodiments of the present disclosure, the second elastic piece may be fixed on the printed circuit board in the shell, and the memory metal may contract in the energized state and extend in the deenergized state. Therefore, when the memory metal is in the deenergized state, the memory metal may have a redundant length. Therefore, when the memory metal is deenergized, the second elastic piece in the embodiments of the present disclosure may contract and further apply an acting force to the memory metal so as to make the memory metal in the straightened state.

Exemplarily, the second elastic piece includes a spring.

In some embodiments, the terminal device further includes: a limiting block, positioned in a stretching direction of the second elastic piece and configured to, when the memory metal is energized, block the second elastic piece to limit a maximum stretching length of the second elastic piece.

That is, the maximum stretching length of the second elastic piece stretched by the memory metal when the memory metal is energized may be limited through the limiting block, such that the acting force generated by extension and contraction of the memory metal acts on the image acquisition module more.

In some other embodiments, two ends of the limiting block are fixed on the printed circuit board, a gap is formed between a part between the two ends and the printed circuit board, and the memory metal penetrates through the gap to be connected with the second elastic piece. It is to be noted that the gap only allows the memory metal to pass through and limits the second elastic piece to pass through. Therefore, the maximum stretching length of the second elastic piece may be limited through the gap of the limiting block.

In some other embodiments, the limiting block is fixed on the printed circuit board, and is provided with a through groove, and the memory metal penetrates through the through groove to be connected with the second elastic piece. It is to be noted that the through groove only allows the memory metal to pass through and limits the second elastic piece to pass through. Therefore, the maximum stretching length of the second elastic piece may be limited through the through groove of the limiting block.

Figure 8:
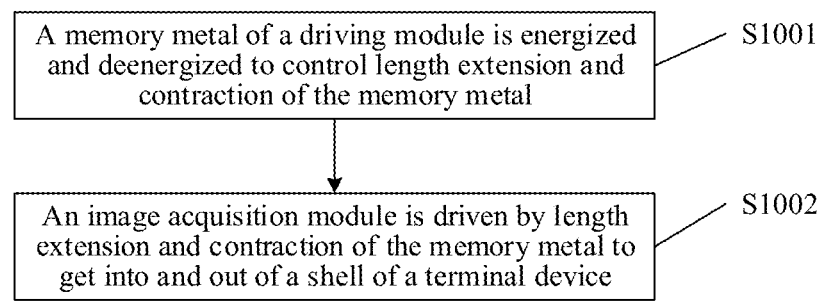
FIG. 8 is a flow chart showing a method for controlling an image acquisition module, according to an embodiment.

The embodiments of the present disclosure also disclose a terminal device control method. As illustrated in FIG. 8, the method includes the following operations.

At S1001, a memory metal of a driving module is energized and deenergized to control length extension and contraction of the memory metal.

At S1002, an image acquisition module is driven by length extension and contraction of the memory metal to get into and out of a shell of a terminal device.

It can be understood that, in the embodiments of the present disclosure, the image acquisition module is controlled by length extension and contraction of the memory metal in energized and deenergized states to get into and out of the shell. That is, in the embodiments of the present disclosure, the image acquisition module is not driven by a conventional driving module consisting of a motor and a lead screw anymore, but is driven by the memory metal.

Therefore, on one hand, a size of the terminal device occupied by the memory metal is far less than a size of the terminal device occupied by the conventional driving module, a space of the terminal device occupied by the driving module may be reduced, and the space utilization rate of the terminal device may be increased. On the other hand, compared with existing implementation of driving by cooperation of at least three devices, the embodiments of the present disclosure has the advantages that the image acquisition module may be controlled only through the memory metal to get into and out of the shell, the number of driving devices may be reduced, and a structural design of the driving device may be simplified.

In some embodiments, the operation that the image acquisition module is driven by length extension and contraction of the memory metal to get into and out of the shell of the terminal device includes that: a rotating part connected with the memory metal is driven to rotate by length extension and contraction of the memory metal; a length of a first elastic piece connected with the rotating part and the image acquisition module is changed by rotation of the rotating part; and the image acquisition module is driven by length changing of the first elastic piece to get into and out of the shell.

In some embodiments, the operation that the rotating part connected with the memory metal is driven to rotate by length extension and contraction of the memory metal includes that: the rotating part connected with a first metal piece is driven to rotate clockwise by length extension and contraction of the first metal piece of the memory metal; and the rotating part connected with a second metal piece is driven to rotate counterclockwise by length extension and contraction of the second metal piece different from the first metal piece in energizing time of the memory metal.

It can be understood that, in the embodiments of the present disclosure, the rotating part may be driven to rotate in opposite directions based on acting forces generated by length extension and contraction of the first metal piece and the second metal piece in the energized state to further drive the image acquisition module connected with the rotating part to get into and out of the shell. It can be seen that, in the embodiments of the present disclosure, the image acquisition module is not driven by an acting force generated by the conventional motor anymore, but is driven by the acting forces generated by contraction of the two metal pieces under temperature changing, such that the occupied space of the terminal device may be reduced, the space utilization rate of the terminal device may be increased, and the structural design of the driving module may also be simplified.

In some embodiments, the method further includes that: the memory metal releasing a contraction length in a deenergized state is tensioned through a second elastic piece connected with the memory metal to make the memory metal in a straightened state.

In some embodiments, the method further includes that: a maximum stretching length of the second elastic piece is limited based on a limiting block in a stretching direction of the second elastic piece.

With respect to the method in the above embodiment, the specific manners for performing operations for individual modules therein have been described in detail in the embodiments regarding the terminal device, which will not be elaborated herein.

It is to be noted that "first" and "second" in the embodiments of the present disclosure are only for convenient expression and distinguishing and have no other special meanings.

Figure 9:
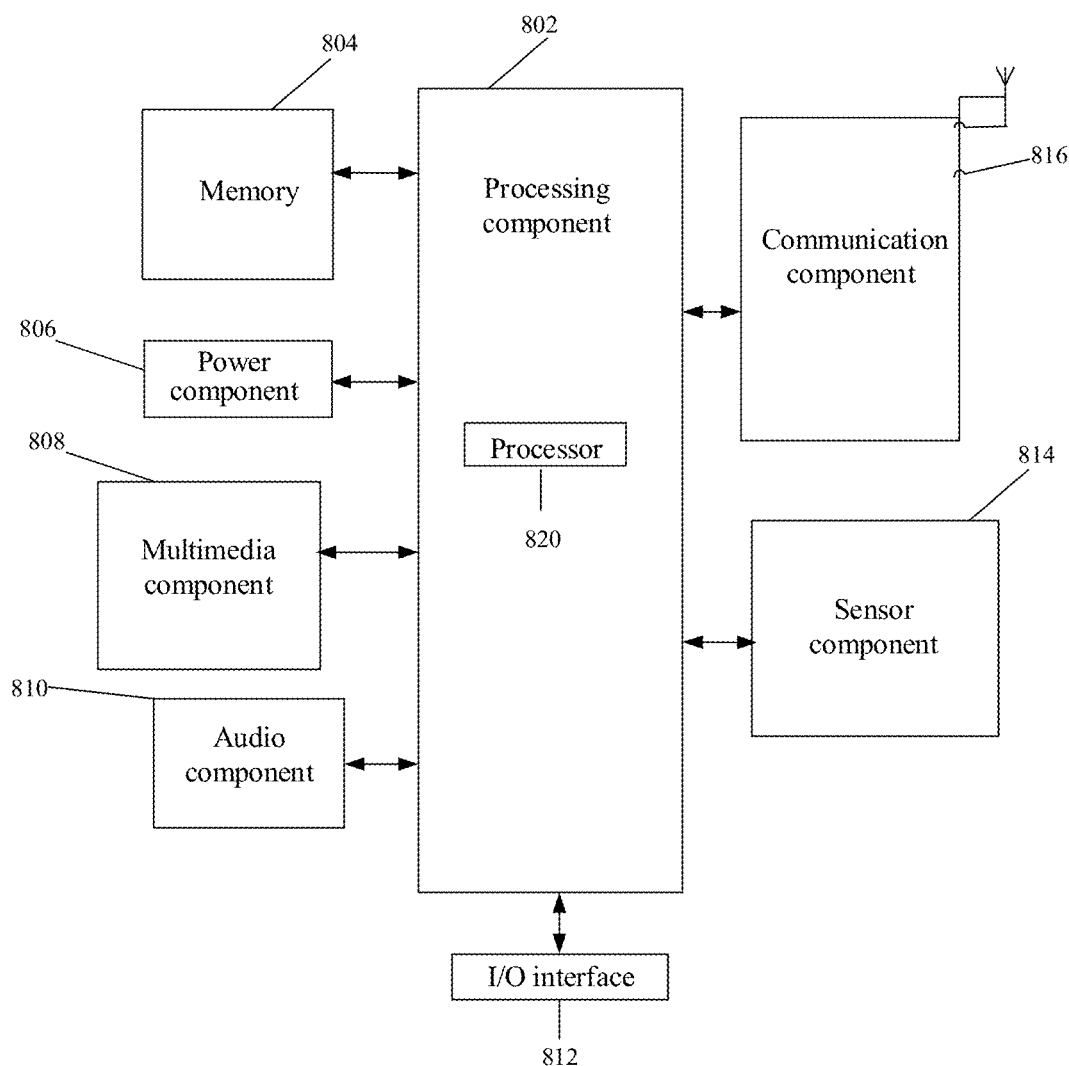
FIG. 9 is a block diagram of a terminal device, according to an embodiment.

FIG. 9 is a block diagram of a terminal device, according to an embodiment. For example, the terminal device may be a mobile phone, a computer, a digital broadcast terminal, a messaging device, a gaming console, a tablet, a medical device, exercise equipment, a personal digital assistant, and the like.

Referring to FIG. 9, the terminal device may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the terminal device. Examples of such data include instructions for any applications or methods operated on the terminal device, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the terminal device. The power component 806 may include a power management system, one or more power supplies, and other components associated with generation, management and distribution of power for the terminal device.

The multimedia component 808 includes a screen providing an output interface between the terminal device and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive external multimedia data when the terminal device is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC), and the MIC is configured to receive an external audio signal when the terminal device is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons and the like. The buttons may include, but are not limited to: a home button, a volume button, a starting button and a locking button.

The sensor component 814 includes one or more sensors configured to provide status assessments in various aspects for the terminal device. For instance, the sensor component 814 may detect an on/off status of the terminal device and relative positioning of components, such as a display and small keyboard of the terminal device, and the sensor component 814 may further detect a change in a position of the terminal device or a component of the terminal device, presence or absence of contact between the user and the terminal device, orientation or acceleration/deceleration of the terminal device and a change in temperature of the terminal device. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the terminal device and other devices. The terminal device may access a communication-standard-based wireless network, such as a wireless fidelity (WiFi) network, a 2nd-generation (2G) or 3rd-generation (3G) network or a combination thereof. In an embodiment, the communication component 816 receives a broadcast signal or broadcast associated information from an external broadcast management system through a broadcast channel. In an embodiment, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an embodiment, the terminal device may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. Hogo teaches A terminal device, comprising:
a shell;
an image acquirer disposed at least partially in the shell; and
a driver, positioned in the shell and connected with the image acquirer, the driver comprising a memory metal;
wherein the memory metal has different lengths in an energized state and a deenergized state, and is configured to control the image acquirer to get into and out of the shell by length extension and contraction,
wherein the memory metal comprises a first metal piece and a second metal piece different from the first metal piece in energizing time;
wherein the driver further comprises a rotating part and a first elastic piece, wherein the rotating part is connected with the first metal piece and the second metal piece, and a first end of the first elastic piece is fixedly connected with the rotating part and a second end of the first elastic piece is connected with the image acquirer; and
wherein the terminal device further comprising:
a printed circuit board, positioned in the shell and having a through hole;
wherein both the rotating part and the first metal piece are on a first surface of the printed circuit board, the second metal piece is on a second surface of the printed circuit board which is an opposite surface of the first surface, and the second metal piece penetrates through the through hole to be connected with the rotating part.

2. The terminal device of claim 1,
wherein the rotating part is driven to rotate clockwise in response to the first metal piece being energized and contracting, and the rotating part is driven to rotate counterclockwise in response to the second metal piece being energized and contracting; and
wherein a length of the first elastic piece changes along with rotation of the rotating part, and the image acquirer gets into and out of the shell along with length changing of the first elastic piece.

3. The terminal device of claim 1, wherein the rotating part is a rotating shaft;
wherein the first metal piece is connected with the rotating shaft at a first junction, the second metal piece is connected with the rotating shaft at a second junction, and the first junction and the second junction are at different positions on a same straight line.

4. The terminal device of claim 1, wherein the driver further comprises: a fixed ring fixed on the rotating part;
wherein the first metal piece and the second metal piece are connected with the rotating part through the fixed ring respectively.

5. The terminal device of claim 1, further comprising a second rotating part, wherein the rotating part and the second rotating part are respectively connected with different memory metals.

6. The terminal device of claim 1, further comprising: a pulley block, comprising at least two pulleys at different positions;
   wherein the memory metal surrounds the pulley block, and the memory metal extends and contracts along a surrounding path.

7. The terminal device of claim 1, further comprising: a second elastic piece having one end fixed in the shell and the other end connected with the memory metal;
   wherein the second elastic piece is stretched in response to the memory metal being energized, and the second elastic piece contracts to tension the memory metal releasing a contraction length in the deenergized state to make the memory metal in a straightened state in response to the memory metal being deenergized.

8. The terminal device of claim 7, further comprising:
   a limiting block, positioned in a stretching direction of the second elastic piece and configured to, in response to the memory metal being energized, block the second elastic piece to limit a maximum stretching length of the second elastic piece.

9. A method for controlling an image acquirer, comprising:
   energizing and deenergizing a memory metal of a driver to control length extension and contraction of the memory metal; and
   driving the image acquirer to get into and out of a shell of a terminal device by length extension and contraction of the memory metal, comprising:
   driving a rotating part connected with the memory metal to rotate by length extension and contraction of the memory metal; and
   changing a length of a first elastic piece connected with the rotating part and the image acquirer by rotation of the rotating part, wherein a first end of the first elastic piece is fixedly connected with the rotating part and a second end of the first elastic piece is connected with the image acquirer,
   wherein the memory metal comprises a first metal piece and a second metal piece different from the first metal piece in energizing time; the rotating part is connected with the first metal piece and the second metal piece respectively; and
   wherein the method further comprising:
   forming both the rotating part and the first metal piece on a first surface of a printed circuit board, and forming the second metal piece on a second surface of the printed circuit board which is an opposite surface of the first surface, the second metal piece penetrating through a through hole of the printed circuit board to be connected with the rotating part.

10. The method of claim 9, wherein driving the image acquirer by length extension and contraction of the memory metal to get into and out of the shell of the terminal device further comprises:
    driving the image acquirer by length changing of the first elastic piece to get into and out of the shell.

11. The method of claim 9, wherein driving the rotating part connected with the memory metal to rotate by length extension and contraction of the memory metal comprises:
    driving the rotating part connected with a first metal piece to rotate clockwise by length extension and contraction of the first metal piece of the memory metal; and
    driving the rotating part connected with a second metal piece to rotate counterclockwise by length extension and contraction of the second metal piece of the memory metal, wherein the second metal piece is different from the first metal piece in energizing time.

12. The method of claim 9, further comprising:
    tensioning the memory metal releasing a contraction length in a deenergized state through a second elastic piece connected with the memory metal to make the memory metal in a straightened state.

13. The method of claim 12, further comprising:
    limiting a maximum stretching length of the second elastic piece based on a limiting block positioned in a stretching direction of the second elastic piece.

14. A non-transitory computer-readable storage medium, in which computer-executable instructions are stored, the computer-executable instructions being executed by a processor to implement acts comprising:
    energizing and deenergizing a memory metal of a driver to control length extension and contraction of the memory metal; and
    driving an image acquirer to get into and out of a shell of a terminal device by length extension and contraction of the memory metal, comprising:
    driving a rotating part connected with the memory metal to rotate by length extension and contraction of the memory metal;
    changing a length of a first elastic piece connected with the rotating part and the image acquirer by rotation of the rotating part, wherein a first end of the first elastic piece is fixedly connected with the rotating part and a second end of the first elastic piece is connected with the image acquirer,
    wherein the memory metal comprises a first metal piece and a second metal piece different from the first metal piece in energizing time; the rotating part is connected with the first metal piece and the second metal piece respectively; and
    wherein the method further comprising:
    forming both the rotating part and the first metal piece on a first surface of a printed circuit board, and forming the second metal piece on a second surface of the printed circuit board which is an opposite surface of the first surface, the second metal piece penetrating through a through hole of the printed circuit board to be connected with the rotating part.

15. The non-transitory computer-readable storage medium of claim 14, wherein driving the image acquirer by length extension and contraction of the memory metal to get into and out of the shell of the terminal device further comprises:
    driving the image acquirer by length changing of the first elastic piece to get into and out of the shell.

16. The non-transitory computer-readable storage medium of claim 14, wherein driving the rotating part connected with the memory metal to rotate by length extension and contraction of the memory metal comprises:
    driving the rotating part connected with a first metal piece to rotate clockwise by length extension and contraction of the first metal piece of the memory metal; and
    driving the rotating part connected with a second metal piece to rotate counterclockwise by length extension and contraction of the second metal piece of the memory metal, wherein the second metal piece is different from the first metal piece in energizing time.

17. The non-transitory computer-readable storage medium of claim claim 14, the processor is caused for implement acts further comprising:
    tensioning the memory metal releasing a contraction length in a deenergized state through a second elastic piece connected with the memory metal to make the memory metal in a straightened state.

18. The non-transitory computer-readable storage medium of claim 17, the processor is caused for implement acts further comprising:
limiting a maximum stretching length of the second elastic piece based on a limiting block positioned in a stretching direction of the second elastic piece.

* * * * *